United States Patent
Neu et al.

(10) Patent No.: US 9,818,308 B2
(45) Date of Patent: Nov. 14, 2017

(54) AGRICULTURAL MACHINE SIMULATOR

(71) Applicant: CLAAS SELBSTFAHRENDE ERNTEMASCHINEN GMBH, Harsewinkel (DE)

(72) Inventors: Sebastian Neu, Bad Laer (DE); Kai Bergmann, Werther (DE); Marcel Vonde, Hilter am Teutoburger Wald (DE); Olaf Rehders, Muenster (DE); Michael Piontek, Suesel (DE); Jens Broer, Bad Wuennenberg (DE); Benjamin Mattich, Bielefeld (DE); Boris Kettelhoit, Guetersloh (DE)

(73) Assignee: CLAAS Selbstfahrende Emtemaschinen GmbH, Harsewinkel (DE)

( * ) Notice: Subject to any disclaimer, the term of this patent is extended or adjusted under 35 U.S.C. 154(b) by 383 days.

(21) Appl. No.: 14/336,056

(22) Filed: Jul. 21, 2014

(65) Prior Publication Data
US 2015/0024354 A1   Jan. 22, 2015

(30) Foreign Application Priority Data
Jul. 22, 2013   (DE) .......................... 10 2013 107 766

(51) Int. Cl.
G09B 9/05   (2006.01)
(52) U.S. Cl.
CPC ...................................... *G09B 9/05* (2013.01)
(58) Field of Classification Search
CPC ... G09B 9/00; G09B 9/02; G09B 9/04; G09B 9/05
See application file for complete search history.

(56) References Cited

U.S. PATENT DOCUMENTS

| 6,719,563 | B2 | 4/2004 | Donges | |
|---|---|---|---|---|
| 2003/0023740 | A1* | 1/2003 | White | H04L 67/38 709/230 |
| 2003/0066277 | A1 | 4/2003 | Behnke | |
| 2004/0158476 | A1* | 8/2004 | Blessinger | G09B 9/02 434/65 |
| 2007/0077541 | A1* | 4/2007 | Champagne | G06F 17/5009 434/62 |
| 2007/0255470 | A1* | 11/2007 | Diekhans | A01B 69/008 701/50 |

(Continued)

FOREIGN PATENT DOCUMENTS

| DE | 101 47 733 | 4/2003 |
|---|---|---|
| EP | 1 231 582 | 8/2002 |

*Primary Examiner* — Timothy A Musselman
(74) *Attorney, Agent, or Firm* — Michael J. Striker; Elizabeth C. Richter

(57) ABSTRACT

A simulator of an agricultural working machine has a computer unit coupled to a display unit and a control unit. The agricultural working machine to be simulated has adjustable working parts and control elements that implement adjustment of the working parts and a software module that is stored in the computer unit. The software module depicts a process model of crop-processing processes to be implemented by the agricultural working machine and depicts the machine behavior resulting from the crop-processing processes. The process model and the machine behavior are visualized in the display unit and can be edited by the control unit.

15 Claims, 5 Drawing Sheets

(56) References Cited

U.S. PATENT DOCUMENTS

2009/0186325 A1* 7/2009 Kumar ................... B61C 17/12
    434/219
2011/0102464 A1* 5/2011 Godavari .............. G06F 3/0416
    345/650

* cited by examiner

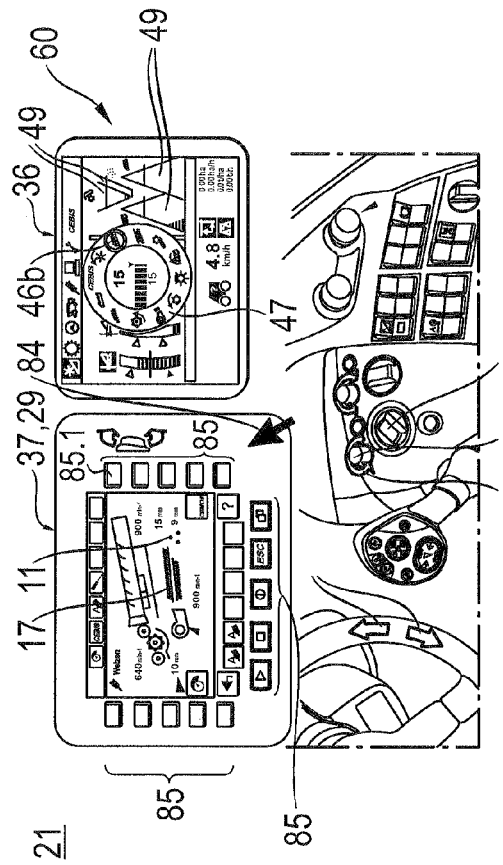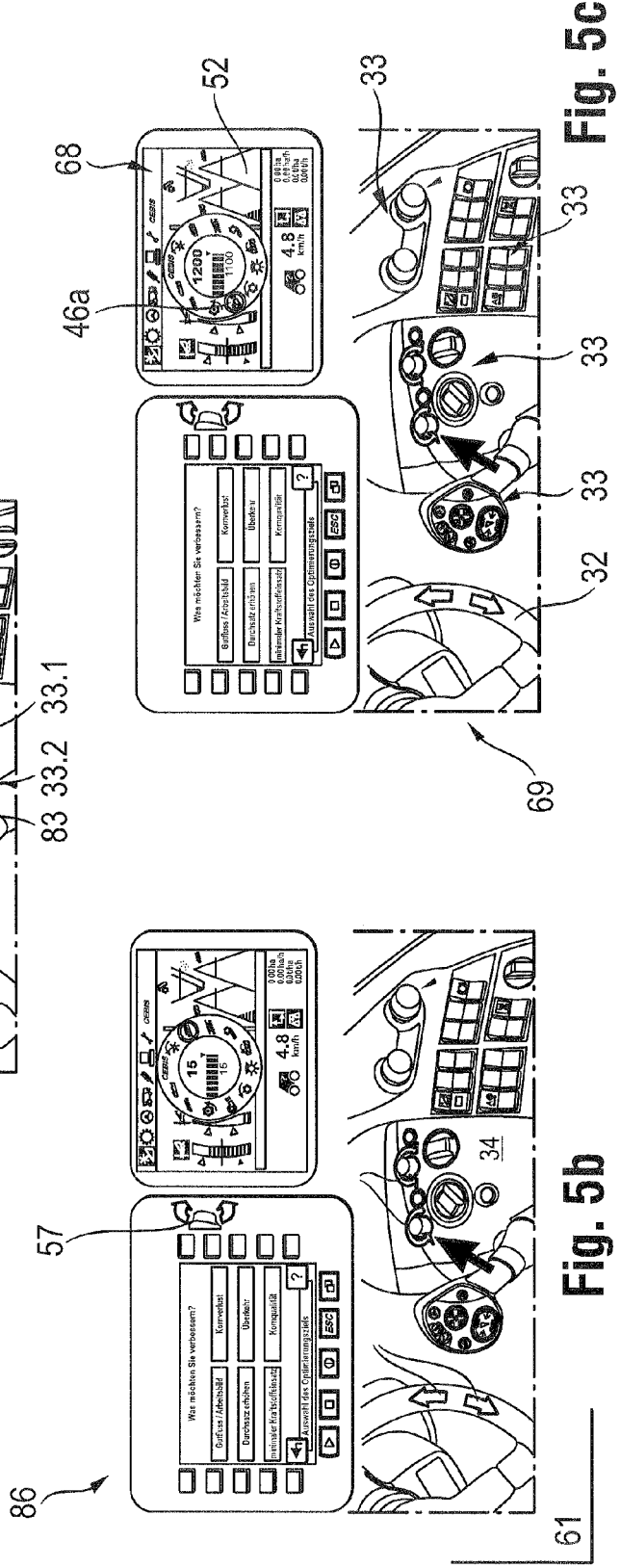

AGRICULTURAL MACHINE SIMULATOR

CROSS-REFERENCE TO A RELATED APPLICATION

The invention described and claimed hereinbelow is also described in German Priority Document DE 10 2013 107766.8, filed on Jul. 22, 2013. The German Priority Document, the subject matter of which is incorporated herein by reference, provides the basis for a claim of priority of invention under 35 U.S.C. 119(a)-(d).

BACKGROUND OF THE INVENTION

The invention relates to a simulator of an agricultural working machine that includes a computer unit coupled to a display unit (60) and a control unit, wherein the agricultural working machine to be simulated comprises adjustable working parts and control elements that implement the adjustment of the working parts.

Related prior art is known from the field of vehicles per se which relates to the simulation of vehicles with the objective of training operators of these vehicles in a simulation environment to improve the skills required to operate the particular vehicles without the need to drive the actual vehicle on the road or on the field. Reference is made to EP 1 231 582, for example, which discloses a driving simulator for simulating the movement of a vehicle on the road. The objective of such systems is that of training the driver of the vehicle to operate the vehicle in order to ensure that the driver also can learn how to handle difficult driving situations without exposing himself and others to hazardous situations. A substantial disadvantage of such systems, however, is that the driving simulators are technically complex, due to the realistic depiction of the environment and, therefore, the operator must always seek out such a simulator and is unable to operate this simulator in a flexible manner from any location.

SUMMARY OF THE INVENTION

The present invention overcomes the shortcomings of known arts, such as those mentioned above.

To that end, the present invention provides a machine simulator that is easy to operate and does not require complex technical equipment.

The simulator of an agricultural working machine comprises at least one computer unit, which is coupled to at least one display unit and one control unit, wherein the agricultural working machine to be simulated comprises adjustable working parts and a software module is stored in the computer unit. The software module depicts, at the least, the process module of the crop-processing processes to be implemented by the agricultural working machine and depicts the machine behavior resulting from the crop-processing process. The process model and the machine behavior are visualized in the display unit and are edited by the control unit. The display unit simulates a realistic user interface in such a way that, in addition to the visualization of the real control elements, the crop-processing process and the machine behavior are visualized and the visualized control elements and a steering wheel are animated such that these can be operated in the same manner as the control elements actually positioned in the agricultural working machine. The machine simulator is therefore easy to operate and does not require complex technical equipment.

The simulator provides the operator with realistic simulation conditions that enable him/her to learn, in advance, how to efficiently run an agricultural working machine in a harvesting process.

The near-realistic simulation results of the entire crop-processing process are achieved when the process model accounts for crop-specific parameters, machine-specific parameters and environment-specific parameters and, from these parameters and on the basis of stored characteristic curves and/or families of characteristic curves, determines quality parameters, at least, of the agricultural working machine and visualizes these, as the machine behavior, in the display unit. This also has the effect that the operator of the simulator can learn about process relationships and learn how to optimize a machine setting.

A simple depiction of the complex control processes within the agricultural working machine is achieved in that the simulated agricultural working machine comprises a plurality of controllable working parts and the control of the working parts is simulated by these dedicated control units in such a way that the computer unit comprises at least one software module that simulates the logical behavior of the control units.

In order to ensure that the machine simulator does not require complex technical means and can be used in a flexible manner, the computer unit is designed as a home PC and, at the least, the software module forming the simulator is available in a global data network and/or a cloud and can be activated by a home PC. This also has the effect that the simulation of the machine behavior of the agricultural working machine can be structured as an on-line learning platform.

The simulation of the real conditions becomes that much more precise the greater the number of parameters of the real process. Accordingly, the computer unit comprises software modules for simulating the process model, the machine behavior and the control units dedicated to the particular agricultural working machine.

In order to ensure that the simulator can be depicted in a home PC and that the quantities of data to be processed correspond to the computing power of a home PC, the software modules depict, at the least, an electronic fieldwork information system and/or an electronic machine optimization system and/or an automated driving system. Therein, at the least, the software modules, the display unit and the stored process model or process models are linked to one another in the software via a virtual CAN bus.

In order to ensure that the operator can easily transfer the operating conditions to the agricultural working machine, the display unit realistically visualizes the electronic fieldwork information system, the electronic machine optimization system, the automated driving system, and the user interface.

The quality of the simulation results is mainly influenced by the fact that the process model and the machine behavior derived therefrom depict real operating states of the agricultural working machine.

In addition, the simulator can be used in a highly flexible manner when the type of agricultural working machine to be simulated is selectable and the particular software module to be activated and which relates to the electronic fieldwork information system, the electronic machine optimization system, and the automated driving system correspond to the original software modules.

In order to protect the user of the simulator from over-stimulation and simultaneously ensure a high recognition value on the actual agricultural working machine, it is provided that the visualization of the realistic user interface comprises, at the least, the steering wheel and the control elements positioned in the driver's cab of the particular agricultural working machine. This effect is also further enhanced when the control elements comprise control elements dedicated to a machine console and display units positioned in the driver's cab of the agricultural working machine.

A simple implementation of the simulated actuation of the control elements is achieved when direction arrows are dedicated to the steering wheel and the control elements, wherein the actuation of these direction arrows activates the steering wheel and the particular control elements.

A simulation condition that approximates the real conditions on the agricultural working machine with respect to setting editable parameters is achieved when the activation of the direction arrows simulates a steering motion or the adjustment of a machine parameter, wherein the activation of the control elements comprises a selection of a working menu, navigation in the selected working menu, and a selection of certain adjustment values of the machine parameters. This effect also is improved in that the activation of the direction arrows is induced by the actuation of a graphical actuating means dedicated to the computer unit or, in the event that the display unit is designed as a touchscreen monitor, by directly touching the touchscreen monitor.

BRIEF. DESCRIPTION OF THE DRAWINGS

Further features and advantages of the invention will become apparent from the description of embodiments that follows, with reference to the attached figures, wherein:

FIG. 5a depicts a detailed view of a simulated machine setting;

FIG. 5b depicts another detailed view of a simulated machine setting; and

FIG. 5c depicts another detailed view of a simulated machine setting.

DETAILED DESCRIPTION OF THE INVENTION

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
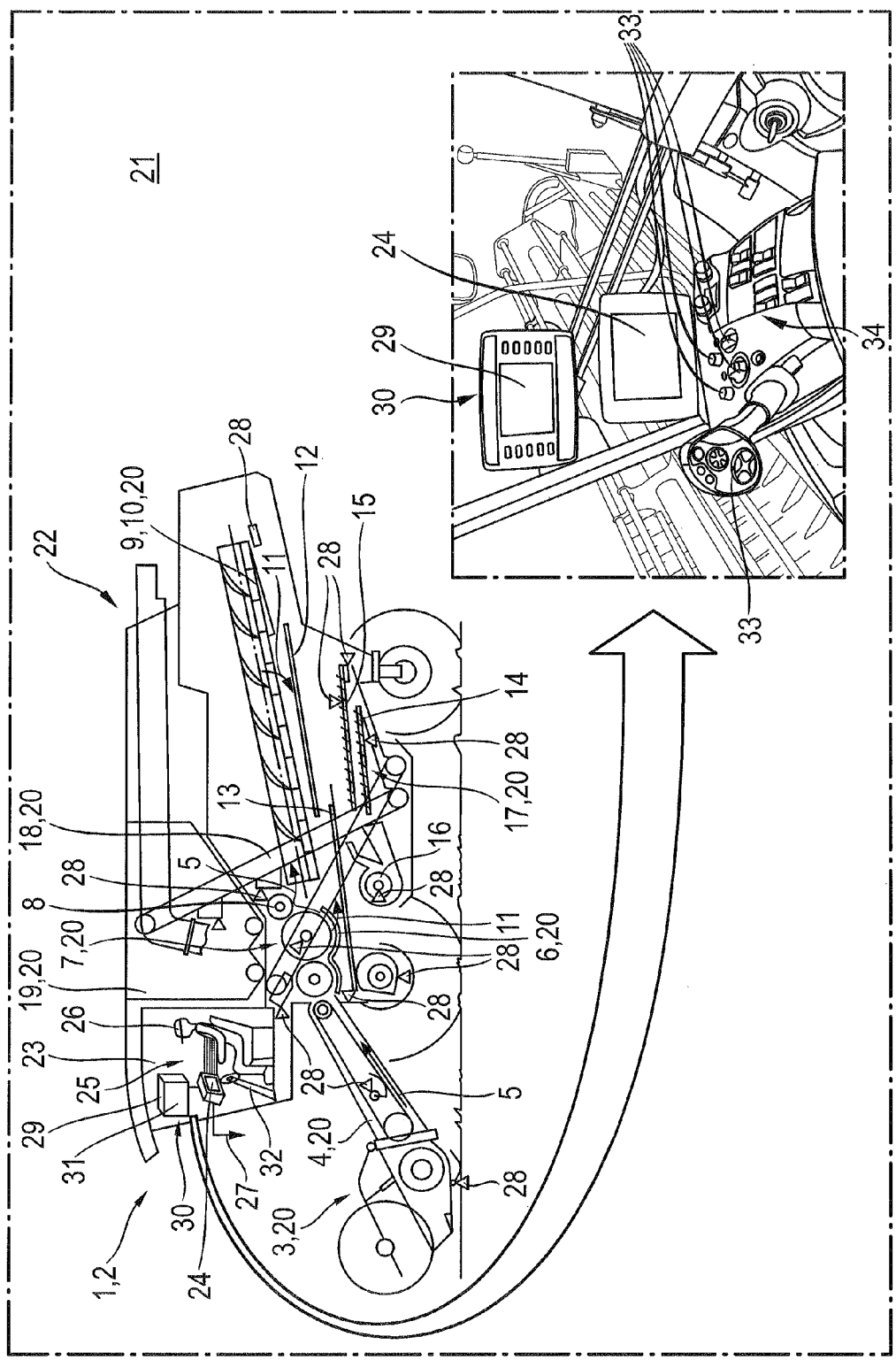
FIG. 1 depicts a schematic view of an agricultural working machine to be simulated according to the invention.

The agricultural working machine 1 depicted schematically in FIG. 1 is designed as a combine harvester 2 and is the simulation object 22 to be simulated by the simulator 21 according to the invention, which is described in greater detail in the following.

The combine harvester 2 comprises a grain-cutting device 3 in the front region thereof, which is connected in a manner known per se to the feed rake 4 of the combine harvester 2. The crop stream 5 passing through the feed rake 4 is transferred in the upper, rear region of the feed rake 4 to the threshing parts 7 of the combine harvester 2, which are at least partially enclosed on the underside by the concave 6. A guide drum 8 disposed downstream of the threshing parts 7 redirects the crop stream 5 emerging from the threshing parts 7 in the rear region of these threshing parts such that the crop stream is transferred directly to a separating device 10 designed as a separating rotor 9. The crop stream 5 is conveyed in the rotating separating rotor 9 such that any unencumbered grains 11 contained in the crop stream 5 are separated out in the region underneath the separating rotor 9.

The separating device 10, which is designed as a separating rotor 9 in the exemplary embodiment shown, may be alternatively designed as a tray-type shaker, which is known per se and is therefore not depicted. The grains 11 that are separated out at the concave 6 and at the separating rotor 9 are directed via the return pan 12 and the feed pan 13 to a cleaning device 17, which comprises a plurality of sieve levels 14, 15, and a blower 16. The cleaned flow of grain is then transferred via elevators 18 to a grain tank 19. In the following, the grain-cutting device 3, the feed rake 4, the threshing parts 7 and the concave 6 assigned thereto, the separating device 10, the cleaning device 17, the elevators 18 and the grain tank 19 are referred to as the working parts 20 of the agricultural working machine 1.

The agricultural working machine 1 also comprises a driver's cab 23, in which at least one control/regulating unit 25 equipped with a display device 24 is disposed. The control/regulating unit 25 controls a plurality of processes (which are known per se and are therefore not described in greater detail) wherein the processes are initiated automatically or by the operator 26 of the agricultural working machine 1. The control/regulating unit 25 communicates via a bus system 27 in a manner known per se with a large number of sensor systems 28. The structure of the sensor systems 28 is described in detail in DE 101 47 733, the entire contents of which are hereby incorporated in the disclosure of this patent application. Hence, the structure of sensor systems 28 will not be described once more in the following. In addition, the control/regulating unit 25 is coupled to a driver assistance system 30 comprising a display unit 29. It lies within the scope of the invention for the driver assistance system 30 to be integrated directly in the control/regulating unit 25 and for the information 31, which is provided by the driver assistance system 30 to be visualized directly in the display unit 24 assigned to the control/regulating unit 25. The driver's cab 23 also comprises a steering wheel 32 and a control console 34 comprising a plurality of control elements 33. The one or more display units 24, 29 are positioned in the region of the control console 34 such that the operator 26 of the agricultural working machine 1 can detect the control elements 33 and the display units 24, 29 in one field of view.

Figure 2:
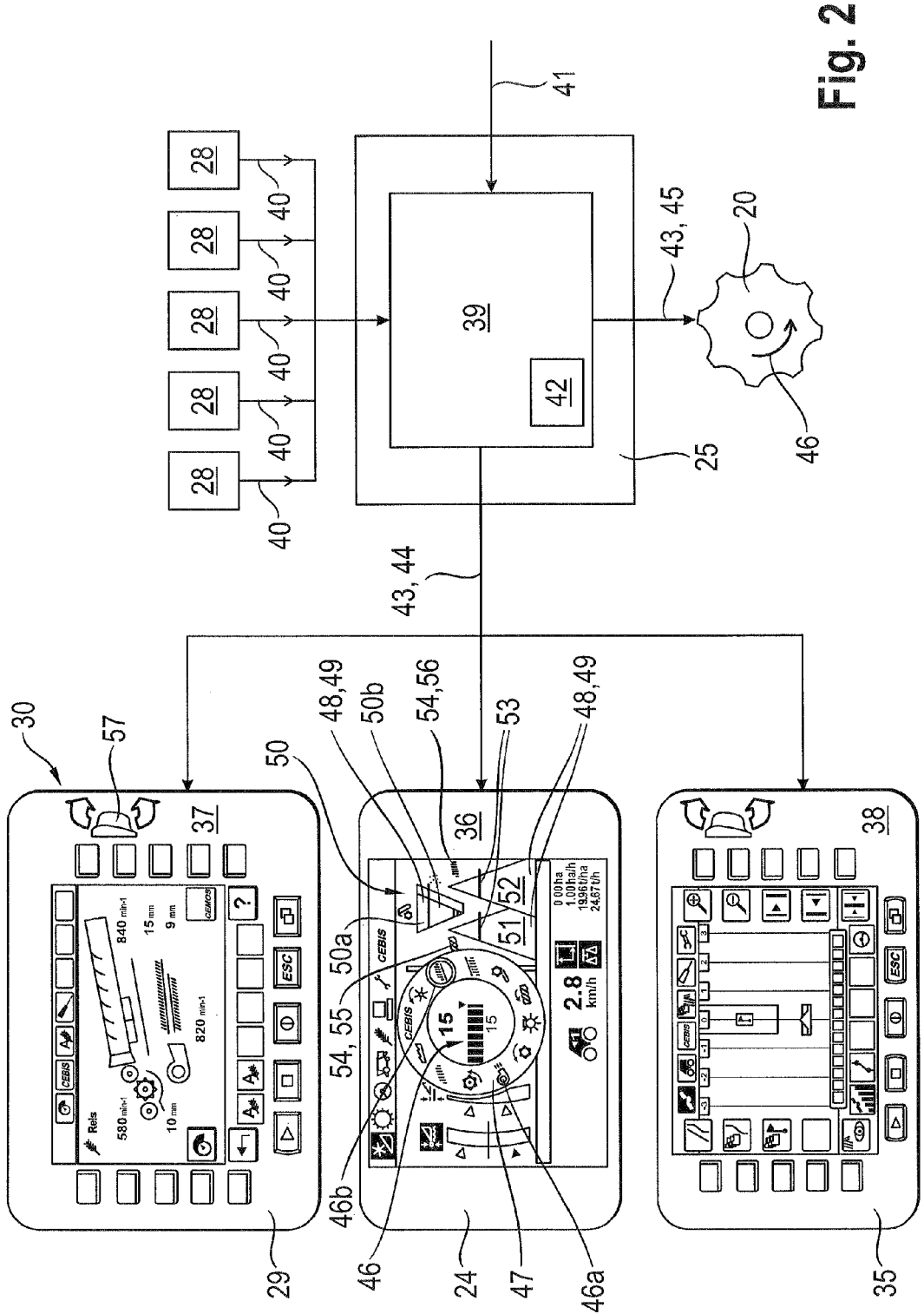
FIG. 2 depicts a detailed view of the process modules to be simulated according to the invention.

FIG. 2 shows a schematic representation of the control/regulating unit 25 and the coupling thereof to a plurality of display units 24, 29, 35. The display unit 24 visualizes an electronic fieldwork information system 36. The display unit 29 dedicated to the driver assistance system 30 visualizes an electronic machine optimization system 37, which is dedicated to the agricultural working machine 1. The display unit 35 shown at the bottom in FIG. 2 visualizes a so-called automated driving system 38, which is also referred to as a GPS pilot. The automated driving system 38 is not required to have a separate display unit 35, but rather for it to be possible to call up the automated driving system 38, for example, in the display unit 29 dedicated to the driver assistance system 30.

In addition, a computer unit 39 is dedicated to the control/regulating unit 25, which is designed such that this computer unit can process not only the internal information 40 generated by the sensor systems 28, but also external information 41 and information 42 stored in the computer unit 39 itself, such as expert knowledge, such that this processing results in a plurality of output signals 43. The output signals 43 are designed such that these include, at the least, display control signals 44 and working part signals 45. Display control signals determine the content of the display units 24, 29, 35 and working part signals initiate the change of the highly diverse working parameters 46 of the working parts 20 of the agricultural working machine 1. The arrow 46 symbolizes the cylinder speed. The available display units 24, 29, 35 also are designed to exchange data with one another and with the control/regulating unit 25.

The content of the display units 24, 29, 35 depicted in FIG. 2 is provided as an example and is described in greater detail in the following. The display unit 24 dedicated to the electronic fieldwork system 36 comprises, in the central region thereof, a selection field 47 which can be controlled by the operator 26. Therein, settable working parameters 46, such as the blower speed 46a of the blower 16 dedicated to the cleaning mechanism 17 or, as shown, the opening width 46b of the upper sieve level 15 dedicated to the cleaning mechanism 17, are visualized in the selection field 47, wherein the particular current value of the working parameter 46 is displayed in the inner region of the selection field 47.

In addition, the display unit 24 comprises, in the right-side region thereof, display elements 48 for visualizing current values of certain quality parameters 49 of the agricultural working machine 1. As shown, the display element 48 disposed at the top visualizes the composition of the so-called "tailings" 50, wherein the depiction on the left visualizes the "volume of tailings" 50a, and the depiction on the right visualizes the "portion of grain in the tailings" 50b. The lower, left-hand display element 48 visualizes the so-called "losses due to separation" 51, i.e., the grain losses that leave the agricultural working machine 1 in the region thereof via the separating device 10, which is designed as a separating rotor 9 or a tray-type shaker, and are not conveyed into the grain tank 19.

The lower, right-hand display element 48 visualizes the so-called "losses due to cleaning" 52. Therein, the grain losses are displayed that leave the agricultural working machine 1 via the cleaning device 17 in a manner similar to that of the separating device 10, and are not conveyed into the grain tank 19. Each of the display elements 39 also comprises a setpoint-value display mechanism 53, which is designed as a horizontal line and defines the maximum permissible loss of the particular quality parameter 49, which was previously defined by the operator 26. This permits the operator 26 to quickly recognize whether the quality of work being performed by the agricultural working machine 1 is sufficient. Due to the complex interrelationships between highly diverse working parameters 46 and at least the quality parameters 49, the possible settings for the separating device 10 and the cleaning device 17 are stored in so-called automatic settings 54.

In the FIG. 2 embodiment, an automatic separation setting 55 for optimizing the mode of operation of the separating device 10 and an automatic cleaning setting 56 for optimizing the mode of operation of the cleaning device 17 are programmed and stored in the control/evaluating unit 25. Preferably, each of the available automated automatic settings 54 is stored in entirety or in part in the driver assistance system 30. Navigation in the electronic fieldwork system 36 is induced via actuation of the above-described control elements 33 dedicated to the control console 34.

The quality parameters 49 visualized in the electronic fieldwork system 36 are optimized by the electronic machine optimization system 37, wherein navigation in the electronic machine optimization system 37 is performed either via the control elements 33 dedicated to the control console 34 as well as or via a rotate-and-press button 57 dedicated to the display unit 29. Navigation is performed in a similar manner in the display unit 35 of the automated driving system 38, which is known. This is the case primarily because the electronic machine optimization system 37 and the automated driving system 38 are typically operated and visualized by means of the same display unit 29, 35.

Figure 3:
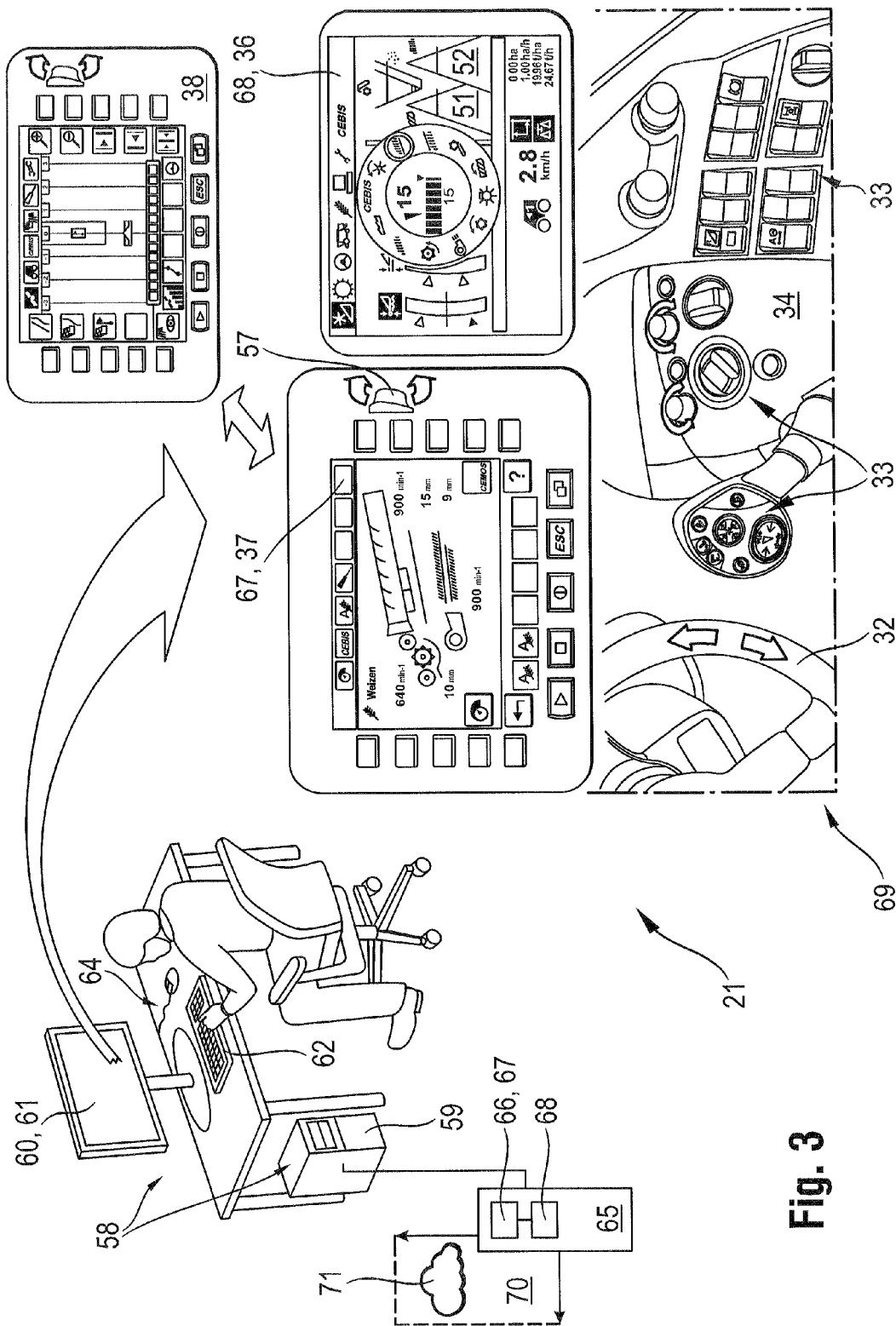
FIG. 3 depicts a schematic view of a simulator of an agricultural working machine according to the invention.

FIG. 3 shows a schematic depiction of the simulator 21 according to the invention, which is represented as an agricultural working machine 1 designed as a combine harvester 2. In an embodiment, the simulator 21 is a so-called home PC 58, which comprises a computer unit 59, a display unit 60 embodied as a monitor 61 and a control unit 64 formed by a keyboard 62 and a control mouse 63. The computer unit 59 comprises, at the least, a software module 65, which depicts a process model 66 of the crop-processing process 67 to be implemented by the agricultural working machine (described above by reference to FIG. 1) and the machine behavior 68 resulting from the crop-processing process 67, and visualizes these in the display unit 60. Therein the visualized crop-processing process 67 and the machine behavior 68 can be edited by the control unit 64 formed by the keyboard 62 and the control mouse 63.

As shown, the crop-processing process 67 is depicted by the visualization of the electronic machine optimization system 37, and the machine behavior 68 is depicted by the visualization of the electronic fieldwork information system 36 on the monitor 61 of the home PC 58, which is the simulator 21. The fieldwork information system 36 and the machine optimization system 37 are realistically displayed on the monitor 61, which also includes the display of the control elements 69, which are dedicated to the display units 24, 29 of these systems 36, 37. In addition, the display unit 60 comprises, in the lower region thereof, a realistic depiction of the steering wheel 32 dedicated to the driver's cab 23 and of the control console 34, and the control elements 33 accommodated by the control console 34, wherein the steering wheel 32, the control console 34, and the control elements 33 dedicated to this control console are referred to collectively in the following as the user interface 69.

The display unit 35 of the automated driving system 38 also may be realistically visualized, in addition or as an alternative, in the display unit 60 of the simulator 21. The display unit 60 of the simulator 21 has the highest information density when this display unit realistically visualizes the electronic fieldwork information system 36, the electronic machine adjustment system 37, the automated driving system 38, and the user interface 69. A highly flexible availability of the simulator 21 according to the invention also is achieved when the software module 65 that is the simulator 21 is available in a global data network 70 or a so-called cloud 71 and can therefore be called up by any home PC 58 and activated thereon. In this manner, the simulator 21 also can be operated as a so-called on-line learning platform for the simulation of the machine behavior 68 of an agricultural working machine 1.

Figure 4:
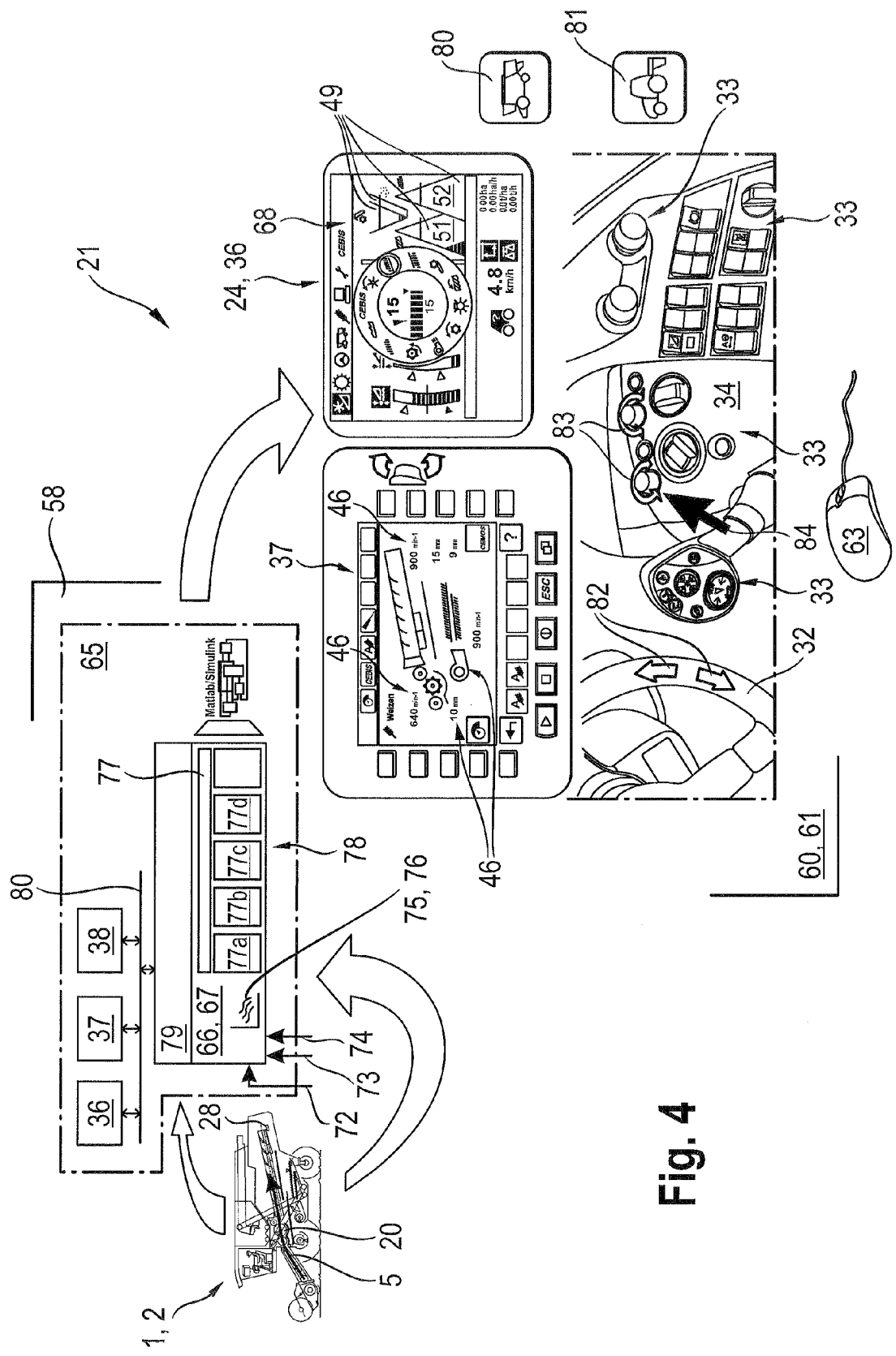
FIG. 4 depicts a detailed view of the structure of the simulator depicted in FIG. 3.

FIG. 4 describes the details of the mode of operation and structure of the simulator 21 according to the invention. Special requirements are placed on the structure of the software module 65 of the simulator 21 to permit the simulator 21 to be operated on a so-called home PC. The mode of operation of an agricultural working machine 1, which is a combine harvester 2 in this case, is decisively determined by the mode of operation of the working parts 20 that process the crop 5, the properties of the crop 5, and highly diverse external influences. These interrelationships are stored in the agricultural working machine 1a, in a manner known per se, as a so-called process model 66. The same process model 66 also is available in the software module 65 of the simulator 21, and therefore the crop-processing process 67 is depicted in the simulator 21 analogously to the agricultural working machine 1.

In order to model the crop-processing process 67, the process model 66 takes into account, in a manner known per se, at least crop-specific parameters 72, machine-specific parameters 73 and environment-specific parameters 74. On the basis of characteristic curves 75 and/or families of characteristic curves 76 stored in the process model 66, the above-described quality parameters 49 of the agricultural working machine 1 are determined and then visualized, as the so-called machine behavior 68, in the display unit 24 representing the fieldwork information system 36 on the monitor 61 of the home PC 58, which is the simulator 21. In order to ensure that all the working parts 20, sensor systems 28, and assemblies transferring working energy that are dedicated to the agricultural working machine 1 function properly, a plurality of control units 77 is dedicated to the agricultural working machine 1 in a manner known per se.

The logical behavior of these control units 77 in the agricultural working machine 1 is simulated in the software module 65 of the simulator 21 in corresponding software modules 78, wherein, in the simplest case, these software modules 78 are exactly those software modules with which the control units 77 are directly equipped in the agricultural working machine 1. The software modules 78 of important control units 77 are schematically indicated in the embodiment depicted herein. This is the main control module 77a, which actuates basic functions of the agricultural working machine 1. In addition, a so-called process-guiding module 77b is provided, which comprises the basic functions of the electronic machine optimization system 37. In the case of agricultural working machines 1 designed as a combine harvester 2, the yield measurement module 77c, which determines, inter alia, the quantity of grain harvested by the combine harvester 2, has special significance, since the crop yield is a control-related guide variable for several control processes taking place in the combine harvester 2. In addition, the control module 77d for processing the control signals of the control elements 33 dedicated to the control console 34 are schematically depicted in FIG. 4.

In addition to the software module 78, which simulates the control units 77, and the process model 66, the software module 65 of the simulator 21 also comprises a visualization software module 79 for controlling the display contents of the display unit 60 dedicated to the simulator 21. In order to allow efficient data processing that handles quantities of data in an efficient manner and, therefore, the use of a home PC 58 to simulate an agricultural working machine 1 in the software module 65 of the simulator 1, the available software modules 79, 78, 66, 38, 37, 36 are linked to one another via a so-called virtual CAN bus 80. The programming of these software modules 79, 78, 66, 38, 37, 36 is preferably implemented in a widespread, technically proven programming environment such as Simulink or Matlab. Given that, at the least, the process models 66 stored in the simulator 21 and the derived machine behavior 68 depict realistic operating states of the agricultural working machine 1, it is ensured also that the simulator 21 very precisely supports the teaching of control skills by an operator 26 of an agricultural working machine 1.

It is furthermore within the scope of the invention that the type of agricultural working machine 1 to be simulated by the simulator 1 is changed, thereby making it possible to simulate combine harvesters 2 of other model years and equipment variants as well as so-called forage harvesters 80 or tractor-attachment combinations 81, or agricultural working vehicles having any design. It also is provided that the particular software module 65, 66, 67, 68 to be activated and which relates to the electronic fieldwork information system 36, the electronic machine optimization system 37, and the automated driving system 38 correspond to the original software modules actually used in the agricultural working machine 1.

The control elements 33 visualized in the user interface 69, and the steering wheel 32 are animated such that these are operated in the same manner as the elements actually positioned in the driver's cab 23. As shown, the directions of motion of the steering wheel 32 and a portion of the control elements 33 are indicated by direction arrows 82, 83. The particular control elements 33 and the steering wheel 32 can implement a change of highly diverse parameters 46, 72, 73, 74 by the mouse pointer 84, which represents the movement of the mouse 63, either by clicking the direction arrows 82, 83 or clicking the control elements 33 directly. The change made to these parameters 46, 72, 73, 74 ultimately results in a change in the machine behavior 68, which is visualized in the display unit 60 of the simulator 21, this change taking place via processing of the software modules stored in the software module 65 of the simulator 21. In this manner, the operator 26 can learn and practice the existing process relationships and suitable setting options.

FIGS. 5a, 5b and 5c together describe the animation structure of the display unit 60 of the simulator 21 in detail. The visualized machine optimization system 37 is animated according to the display unit 29 positioned in the driver's cab 23 and depicts this in a realistic manner. All control elements 85 of the machine optimization system 37 are activated in the simulator 21 in a similar manner by the mouse pointer 84. If the machine optimization system 37 according to FIG. 5a is started by activating the control element 85.1, the visualization region of the machine optimization system 37 switches to the structure displayed in FIG. 5b. It is possible to navigate within the working menu 86, which is now activated, in a similar manner to the display unit 29 positioned in the driver's cab 23 by the simulated rotate-and-press button 57 in the particular working menu 86. In this manner, it is possible to simulate, in analogy to a real implementation of the machine, an optimization of the quality parameters 49 and, therefore, the machine behavior 68 of the agricultural working machine 1, which is a combine harvester 2 in this case. The changes made to the quality parameters 49 and, therefore, the machine behavior 68, ascertained by the software module 65 of the simulator 21 are visualized directly in the fieldwork information system 36 dedicated to the display unit 60.

The graphical depiction and the animation of the fieldwork information system 36 also correspond to the real conditions that result upon operation of the fieldwork information system 36 in the driver's cab 23. All control elements 33 visualized in the user interface 69, including those of the steering wheel 32, are actuated by activation by the mouse pointer 84, in a manner similar to the real conditions in the driver's cab 23. The switchover from the adjustment of the upper sieve width 46*b* (FIG. 5*a*) to the adjustment of the blower speed 46*a* (FIG. 5*c*) is described here as an example. First, the corresponding control element 33.1 is switched from the icon "upper sieve width" to the icon "blower speed" by the mouse pointer 84. This change is visualized in the selection field 47 of the fieldwork information system 36 in that the initially emphasized icon "upper sieve width" 46*b* is faded and the icon "blower speed" 46*a* is emphasized. The control element 33.2 is therefore used to change the current value of the working parameter "blower speed" 46*a*, which is visualized as a bar diagram in the interior of the selection field 47. The change is implemented in the above-described manner, namely by using the mouse pointer 84 to click the right or left side of the direction arrow 83 dedicated to the control element 33.2. The change is then visualized immediately in the selection field 47.

At the same time, the change to the working parameter "blower speed" 46*a* induces a change in the visualized quality parameters 49, which reflect the real conditions on the basis of the stored characteristic curves 75 and families of characteristic curves 76. In the present case, the marked increase in the blower speed 46*a*, which was implemented as an example, resulted in more grain 11 being conveyed in the cleaning mechanism 17 by the increased air flow and out of the combine harvester 2. This increase in the losses due to cleaning 52 is displayed by a correspondingly enlarged, triangular area, which visualizes this quality parameter 49; see FIG. 5*c*. For all parameters that can be edited on the monitor 61, it lies within the scope of the invention that these are not activated by the mouse pointer 84, but rather, in the event that the monitor 61 is designed as a touchscreen monitor, the monitor itself can be touched accordingly in order to edit the particular parameters.

| List of reference characters: | |
|---|---|
| 1 | agricultural working machine |
| 2 | combine harvester |
| 3 | grain-cutting device |
| 4 | feed rake |
| 5 | crop stream |
| 6 | concave |
| 7 | threshing part |
| 8 | guide drum |
| 9 | separating rotor |
| 10 | separating device |
| 11 | Grain |
| 12 | return pan |
| 13 | feed pan |
| 14 | sieve level |
| 15 | sieve level |
| 16 | blower |
| 17 | cleaning mechanism |
| 18 | elevator |
| 19 | grain tank |
| 20 | working part |
| 21 | simulator |
| 22 | simulation object |
| 23 | driver's cab |
| 24 | display unit |
| 25 | control/regulating unit |
| 26 | operator |
| 27 | bus system |
| 28 | sensor system |
| 29 | display unit |

| List of reference characters: | |
|---|---|
| 30 | driver assistance system |
| 31 | information |
| 32 | steering wheel |
| 33 | control elements |
| 34 | control console |
| 35 | display unit |
| 36 | fieldwork information system |
| 37 | machine optimization system |
| 38 | automated driving system |
| 39 | control unit |
| 40 | internal information |
| 41 | external information |
| 42 | information |
| 43 | output signal |
| 44 | display signal |
| 45 | working part signal |
| 46 | working parameter |
| 47 | selection field |
| 48 | display element |
| 49 | quality parameter |
| 50 | tailings |
| 50a | volume of tailings |
| 50b | portion of grain in the tailings |
| 51 | loss due to separation |
| 52 | loss due to cleaning |
| 53 | setpoint-value display mechanism |
| 54 | automatic setting |
| 55 | automatic separation setting |
| 56 | automatic cleaning setting |
| 57 | rotate-and-press switch |
| 58 | home PC |
| 59 | computer unit |
| 60 | display unit |
| 61 | monitor |
| 62 | keyboard |
| 63 | mouse |
| 64 | control unit |
| 65 | software module |
| 66 | process model |
| 67 | crop-processing process |
| 68 | machine behavior |
| 69 | user interface |
| 70 | global data network |
| 71 | Cloud |
| 72 | crop-specific parameter |
| 73 | machine-specific parameter |
| 74 | environment-specific parameter |
| 75 | characteristic curve |
| 76 | family of characteristic curves |
| 77 | control unit |
| 78 | software module |
| 79 | visualization software module |
| 80 | forage harvester |
| 81 | tractor-attachment combination |
| 82 | direction arrow |
| 83 | direction arrow |
| 84 | mouse pointer |
| 85 | control element |
| 86 | working menu |
| 87 | virtual CAN bus |

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A simulator of an agricultural working machine, comprising
at least one computer unit coupled to a display unit and a control unit, where the agricultural working machine to be simulated comprises adjustable working parts and control elements that implement the adjustment of the working parts;

wherein a software module stored in the computer unit depicts a process model of crop-processing processes to be implemented by the agricultural working machine and machine behavior resulting from the crop-processing processes, wherein the software module corresponds to an original software module actually used in the agricultural working machine, wherein the process model and the agricultural working machine behavior are visualized in the display unit and are editable by the control unit, wherein the display unit simulates a realistic user interface by providing a visualization of the control elements, the crop-processing processes and the agricultural working machine behavior whereby the visualized control elements and a steering wheel are animated to be operated as would be control elements and a steering wheel actually positioned in the agricultural working machine.

2. A simulator of an agricultural working machine, comprising at least one computer unit coupled to a display unit and a control unit, where the agricultural working machine to be simulated comprises adjustable working parts and control elements that implement the adjustment of the working parts;

wherein a software module stored in the computer unit depicts a process model of crop-processing processes to be implemented by the agricultural working machine and machine behavior resulting from the crop-processing processes, wherein the software module corresponds to an original software module actually used in the agricultural working machine, wherein the process model and the agricultural working machine behavior are visualized in the display unit and are editable by the control unit, wherein the display unit simulates a realistic user interface by providing a visualization of the control elements, the crop-processing processes and the agricultural working machine behavior whereby the visualized control elements and a steering wheel are animated to be operated as would be control elements and a steering wheel actually positioned in the agricultural working machine, and wherein the process model accounts for crop-specific parameters, machine-specific parameters and environment-specific parameters and, based on said parameters and on stored characteristic curves, families of characteristic curves or both, determines quality parameters of the agricultural working machine to be simulated and visualizes the quality parameters as the machine behavior in the display unit.

3. The simulator of an agricultural working machine according to claim 1, wherein agricultural working machine to be simulated comprises a plurality of controllable working parts and wherein a control of the working parts is simulated by dedicated control units by at least one software module that simulates logical behavior of the control units.

4. The simulator of an agricultural working machine according to claim 1, wherein the computer unit is a home PC and the software module embodying the simulator is available in a global data network, a cloud or both and, is activated by the home PC.

5. The simulator of an agricultural working machine according to claim 4, wherein the simulation of the machine behavior of the agricultural working machine is structured as an on-line learning platform.

6. The simulator of an agricultural working machine according to claim 1, wherein the computer unit comprises software modules for simulating the process model, the machine behavior and the control units dedicated to the particular agricultural working machine.

7. The simulator of an agricultural working machine according to claim 6, wherein the software modules depict one or more of an electronic fieldwork information system, an electronic machine optimization system and an automated driving system, and wherein the software modules, the display unit and the stored process model or process models are linked to one another via a virtual CAN bus.

8. The simulator of an agricultural working machine according to claim 1, wherein the display unit provides a realistic visualization of an electronic fieldwork information system, an electronic machine optimization system, an automated driving system and a user interface.

9. The simulator of an agricultural working machine according to claim 8, wherein the visualization of the realistic user interface comprises a steering wheel and control elements positioned in a driver's cab of the agricultural working machine.

10. The simulator of an agricultural working machine according to claim 9, wherein the control elements comprise control elements dedicated to a machine console and display units positioned in a driver's cab of the agricultural working machine.

11. The simulator of an agricultural working machine according to claim 9, wherein direction arrows are dedicated to the steering wheel and the control elements and wherein actuation of the direction arrows activates the steering wheel and the control elements.

12. The simulator of an agricultural working machine according to claim 11, wherein activation of the direction arrows simulates a steering motion or adjustment of a machine parameter and wherein activation of the control elements comprises a selection of a working menu, navigation in the selected working menu and a selection of adjustment values of the working parameters.

13. The simulator of an agricultural working machine according to claim 11, wherein activation of the direction arrows is induced by an actuation of a control unit dedicated to the computer unit or, in an event that the display unit is designed as a touchscreen monitor, by directly touching the touchscreen monitor.

14. The simulator of an agricultural working machine according to claim 1, wherein the process model and the machine behavior derived therefrom depict real operating states of the agricultural working machine.

15. The simulator of an agricultural working machine according to claim 1, wherein the agricultural working machine to be simulated is selectable and wherein a particular software module to be activated and which relates to an electronic fieldwork information system, an electronic machine optimization system and an automated driving system correspond to original software modules actually used in the agricultural working machine.

* * * * *